United States Patent [19]

Fydelor

[11] 4,148,839

[45] Apr. 10, 1979

[54] GRAFT CO-POLYMERS

[75] Inventor: Peter J. Fydelor, Swindon, England

[73] Assignee: Her Majesty the Queen in right of Canada, as represented by the Minister of National Defence, London, England

[21] Appl. No.: 659,909

[22] Filed: Feb. 20, 1976

[30] Foreign Application Priority Data

Feb. 26, 1975 [GB] United Kingdom ............... 8116/75
Jun. 18, 1975 [GB] United Kingdom ............. 26021/75

[51] Int. Cl.$^2$ .................... C08F 8/42; C08F 255/00; C08F 267/00
[52] U.S. Cl. .............................. 260/857 G; 260/863; 260/870; 260/873; 260/878 R; 260/884
[58] Field of Search ............... 260/878 R, 857 G, 884, 260/863, 870, 873

[56] References Cited

U.S. PATENT DOCUMENTS

| | | | |
|---|---|---|---|
| 3,297,471 | 1/1967 | Traumann | 260/857 G |
| 3,376,168 | 4/1968 | Horowitz | 260/857 G |
| 3,522,223 | 7/1970 | Taylor | 260/878 R |
| 3,951,924 | 4/1976 | Ripley | 260/878 R |

FOREIGN PATENT DOCUMENTS 40542 12/1970 Japan .................... 260/878 R

*Primary Examiner*—Alan Holler
*Attorney, Agent, or Firm*—Stevens, Davis, Miller & Mosher

[57] ABSTRACT

Polymeric materials are disclosed in which a synthetic essentially hydrophobic base polymer has at least in its surface region a crosslinked polar comonomer graft in the surface region at least of which there are metal atoms or ions which are chemically bound and which cannot be removed by solution processes. There are also disclosed three processes by which such materials may be produced. The deposition of a complex metal compound, the contacting of the graft with a metal compound both followed by heating, and graft copolymerization with a metal containing comonomer. There is also disclosed a method of ensuring a good bond between a polymeric material and a coating which includes a preliminary surface graft with a polar comonomer.

30 Claims, No Drawings

GRAFT CO-POLYMERS

The present invention is concerned with modified graft copolymer materials.

Graft copolymer films, either copolymerised throughout the bulk of the film or upon the surface thereof are well known and may be produced by the irradiation of appropriate base polymers, for example polyethylene, polypropylene, in the presence of polar comonomers, for example acrylic or methacrylic acid. Such materials may be used as reverse osmosis membranes, or as separators or diaphragms for electrochemical cells, for example batteries, fuel cells or electrosynthesis cells.

In accordance with the present invention there is provided material which includes a synthetic essentially hydrophobic base polymer having a cross-linked polar comonomer graft at least in its surface region and includes at least in the surface region of the graft metal atoms or ions which are chemically bound and cannot be removed by solution processes. The surface region which incorporates the chemically bound metal atoms or ions may have a thickness within the range 0.05 to $2\mu$ and is preferably within the range 0.1$\mu$ to 0.2$\mu$. The metal atoms or ions may be located throughout the depth of graft.

Suitable base polymers may be any of the polyolefins or copolyolefins, for example polyethylene (low, medium or high density), polypropylene, poly 4-methyl-pentene-1 (and copolymers of these polyolefins), polyamides or copolyamides, for example the nylons, products of other vinyl polymerisations, for example polyvinylacetate and polyvinylalcohol as well as the halogen containing polymers or copolymers, for example polyvinylchloride, chlorinated rubbers, and polytetrafluoroethylene, polychlorofluoroethylene, products of condensation polymerisations, for example the saturated and the un-saturated polyesters, or a mixture of any of these polymers. The physical and chemical form of the base polymers may be as is convenient to the process of manufacture and does not preclude the presence of additives such as filler particles, reinforcing fibres and/or other additives such as thermal or oxidation stabilisers, dyes, and pigments and also includes materials which are semi-permeable by virtue of having micropores introduced by mechanical treatment.

Polar comonomers suitable for grafting include reactive polar vinyl monomers selected from acrylic acid, methacrylic acid, other ethylenic carboxylic acids, for example itaconic acid, ethylenic carboxylic acid amides, for example acrylamide and methacrylamide, and ethylenic carboxylic acid amines, for example butylamine acrylate, and the most advantageous results have been obtained using acrylic acid and butylamine acrylate. Although such comonomers may be copolymerised by any suitable method the preferred technique is radiation initiated grafting with high energy radiation, for example gamma photons or accelerated electrons or an electrically sustained gas plasma and a cobalt-60 source has been found to be particularly advantageous for the production of graft copolymers for use as base polymers for the materials of the present invention because the desired cross-linking is then introduced into the graft at the time of grafting.

The synthetic essentially hydrophobic base-polymer may be a film material and may be homogeneously graft copolymerised throughout its thickness, in which instance the extent of grafting may fall within the range 8% by weight to 90% by weight, with the most advantageous results with respect to the present invention being obtained below 70% by weight. The extent of graft is weight of graft added expressed as a percentage of the weight of the final graft.

Alternatively the said film material may have been graft polymerised on one side in which case the extent of graft polymerisation which has been found advantageous is within the range 0.1% by weight to 5% by weight, on the basis set forth above.

Although materials have been described with coatings of inorganic metal containing glassy materials or metal coatings on synthetic organic polymers in order to provide moisture and gas barrier properties not possessed by the synthetic organic polymers themselves, for example UK Patent Specifications Nos. 1,411,592, 1,411,593, 1,411,594, 1,411,595 and 1,411,596, difficulty is sometimes experienced in ensuring a good bond between the synthetic organic polymer film and the metal or metal containing coating.

In accordance with a feature of the present invention a method of applying a layer of metal containing organic glass material to the surface of a polymeric material includes the preliminary step of graft copolymerising the surface of the said polymeric material with a reactive polar vinyl monomer, as defined above. It has been discovered that acrylic acid and butylamine acrylate give good results. The polymeric material to which it is sought to apply the protective coating may be a film, or it may be a bulk article, for example a container.

The material of the present invention may be produced by contacting a graft copolymer as hereinbefore defined with a metal compound followed by heating to cause reaction between the metal compound and the said graft copolymer whereby metal atoms or ions are chemically bound in at least the surface region of the said graft copolymer and cannot be removed by solution processes.

The aforementioned metal compounds may be selected from a variety of classes of compounds and advantageously one method of preparing material of the present invention is by contacting a graft copolymer as hereinbefore defined with a solution of a complex metal compound, or a mixture of such complexes, by, for example dipping or spraying, then heating first to remove the solvent and eventually to decompose the metal complex to a stable inorganic glass bonded within or on the surface of the graft copolymer. Suitable complexes include the aluminum and other metal phosphate complexes described by R. N. Rothon in Chemistry and Industry, 1 June 1974, P457-459 and metals which may be deposited by this process include aluminium iron, chromium and titanium. The extent of penetration of the metal species may be controlled by limiting the time for which the solution and the graft copolymer are in contact.

As an alternative method of preparation a graft copolymer as previously described may be contacted with a solution of a metal containing compound for a time sufficient to permit penetration of the metal compound into the graft as a desired depth followed by heating to remove the solvent and then flash heating to cause chemical binding of individual metal atoms or ions within or upon the surface of the graft. The flash heating may be carried out by flaming, by induction heating or by hot electrically sustained plasma. The depth to which the metal solution penetrates is determined by the concentration of the solution and by the contact time between the graft copolymer and the solution of metal containing compounds and the appropriate concentration and time for any given product is readily determined by simple experiment. Likewise, the amount of heating to produce a desired result is readily determined by simple experiment.

For example, the hydroxides of alkali or alkaline earth metals, copper nitrates, sulphates or chlorides, lead sulphates and common salts, that is to say sulphates, halides and nitrates, of iron, chromium, nickel, zinc, silver, cadmium, aluminium may be used to produce polymeric material containing the appropriate metal.

As a further alternative method of production of the graft copolymer may be contacted with a solution containing a polymerisable metal containing comonomer, which is then caused to copolymerise with the graft copolymerisation by appropriate conventional means. For example by use of radiation as disclosed above if the metal containing monomer is polymerisable by virtue of unsaturation, or by use of a chemical initiator, for example a peroxide or azobisbutyronitrile. Iron may be introduced into the graft copolymer by this method through the use of vinyl ferrocene, which may be initiated by radiation or by chemical means both free radical and ionic.

The materials of the present invention may be used in applications where plastics or polymeric materials having reduced liquid solvent or gas permeability is required. They may also be used as membrane separators and diaphragms for electrochemical power sources, fuel cells and electrosynthesis cells, for example in chloralkali cells for the production of chlorine and sodium hydroxide or in similar cells for the production of hypochlorites.

The production of materials in accordance with the present invention, together with some of the properties thereof, will now be described by way of example only.

EXAMPLE 1

A base graft copolymerised film was prepared from high density polyethylene (HDPE). A piece measuring 5 feet by 1 foot and $35\mu$ thick was rolled up with a single ply Blue Tissue paper interleaving and placed in a glass tube 22 inches × 1.5 inches, which was then filled with 500 ml of a 30% by volume aqueous solution of acrylic acid and containing 4g/l of Analar ferrous sulphate. The tube and contents were evacuated by water pump for 20 minutes at the end of which time it was back filled with nominally oxygen-free nitrogen and sealed. The tube was irradiated with gamma rays from a $^{60}$Co source at 20° C. to a total absorbed dose of $6 \times 10^5$ rad at a dose rate of $3.5 \times 10^4$ rad per hour. The graft copolymerised HDPE film was removed from the tube, washed three times with distilled water and air dried in a hot air oven. The average weight of copolymerised acrylic acid was found to be 31.5% by weight, being an homogeneous graft.

Sections were cut from the graft copolymerised films and one surface of each covered with a self adhesive protective film. These sections were dipped at 20° C. in a methanol/water solution of a chromium phosphate complex as described by R. N. Rothon, Chemistry and Industry, 1 June 1974, p457–459, immediately removed and heated in air at 80° C. to decompose the complex and yield a glassy chromium phosphate coating. Removal of the protective film yield HDPE coated on only one side.

Samples were tested by clamping in a resistance cell so that 0.25 cm$^2$ circular area was exposed to test between platinum counter electrodes. After being filled with electrolyte the apparatus was allowed to equilibrate to a temperature of 25° C., at which the tests were conducted. The electrolytic resistance of the test samples was determined at 1591.5 hertz ± 0.5 hertz using a Wayne Kerr Auto Balance Universal Bridge. The samples were all pre-soaked in the appropriate electrolyte for 16 hours before being tested.

The resistance values obtained are given in Table 1 below.

TABLE 1

| | | Electrolyte | |
|---|---|---|---|
| Sample | Condition | 30% KOH | 0.6N KCl |
| 1 | Control, no coating | 0.17 Ωcm$^2$ | 1487 Ωcm$^2$ |
| 2 | Coated as described | 0.84 Ωcm$^2$ | 791.0 Ωcm$^2$ |
| 3 | Control, no coating boiled 30 mins in 0.1N HCl before test | 0.16 Ωcm$^2$ | 12.6 Ωcm$^2$ |
| 4 | Coated as described boiled 30 mins in 0.1N HCl before test | — | 7.7 Ωcm$^2$ |

The coating of samples 2 and 4 was completely removed during the test with 30% KOH but was undamaged by 0.6N KCl as tested by X-ray fluorescence analysis for chromium and phosphorus. Analysis showed that as the coated film used for the resistance testing had a chromium content of about 0.015 mg cm$^{-2}$ and phosphorus of about 0.009 mg cm$^{-2}$.

EXAMPLE 2

A base graft copolymerised film was prepared from polytetrafluoroethylene (PTFE). A piece measuring 5 feet by 1 foot and $25\mu$ thick was graft copolymerised in the manner set forth in Example 1 except that it was irradiated to receive a total absorbed dose of $5.7 \times 10^5$ rad at a dose rate of $3.1 \times 10^4$ rad hr$^{-1}$. The average weight of copolymerised acrylic acid was found to be 13.2% by weight.

The graft copolymerised PTFE was coated with a chromium phosphate complex as described in Example 1 and tested in the manner described there to give the results in Table 2.

TABLE 2

| | | Electrolyte | |
|---|---|---|---|
| Sample | Condition | 30% KOH | 0.6N KCl |
| 5 | Control, no coating | 0.30 Ωcm$^2$ | 0.17 Ωcm$^2$ |
| 6 | coated as described | 0.34 Ωcm$^2$ | 0.13 Ωcm$^2$ |
| 7 | Control, no coating boiled 30 mins in 0.1N HCl before test | 0.48 Ωcm$^2$ | 0.68 Ωcm$^2$ |
| 8 | Coated as described boiled for 30 mins in 0.1N HCl before test | — | 0.50 Ωcm$^2$ |

The coating of samples 6 and 8 was completely removed during the test with 30% KOH but was undamaged by 0.6N KCl as tested by X-ray fluorescence analysis for chromium and phosphorus. Analysis showed that as the coated film used for the resistance testing had a chromium content of 0.0175 mg cm$^{-2}$ and phosphorus of 0.010 mg cm$^{-2}$ and after a 16 hour pre-soak in 0.6N KCl the figures were 0.0170 mg cm$^{-2}$ and 0.010 mg cm$^{-2}$ respectively.

Further polymeric film materials may be coated with metal complexes in a manner similar to that disclosed in Examples 1 and 2, for example low density polyethylene, polypropylene and polyvinylchloride. Also the metal complexes may be other than the chromium phosphate disclosed in Examples 1 and 2, for example, aluminium, iron and titanium phosphate as described by R N Rothon in Chemistry and Industry 1 June 1974 P457-459.

EXAMPLE 3.

Two prefabricated nominal 570 cc capacity high density polyethylene containers of average wall thickness 625 micron were filled with an aqeuous solution containing 30% by volume of acrylic acid and 4 gm $1^{-1}$ of "Analar" ferrous sulphate. After degassing of the solution within the containers by purging with a stream of nominally oxygen-free nitrogen gas the whole were irradiated in a $^{\alpha}$Co gamma facility such as to receive a total absorbed dose of $2 \times 10^5$ rad (Dosimetry based upon the Fricke dosimeter and an assumed $G_{ferric}=15.5$). Thereafter the containers were emptied of solution, washed out with distilled water and dried in air at 20° C. for 24 hours; the containers were thereafter found to have their internal surfaces graft-copolymerised with acrylic acid.

A dilute methanol water solution of aluminum phosphoate complex was placed in one of the so graft-copolymerised containers and shaken so as to uniformly coat the inner surface with the solution. The excess solution was poured off and the container heated in an electric oven to a temperature of 80° C. until the inner coating layer was seen to be dry and glassy.

An untreated container, the graft-copolymerised container, and the aluminum treated container, were each filled with an equal volume of Indolene 30 hydrocarbon test fuel and sealed. The permeability rate after an eleven day equilibration period under room conditions at 20° C. was measured by weight loss and found to be 0.730 gms per day for the untreated, 0.081 gms per day for the grafted container, and 0.001 gms per day for the aluminum treated grafted container. This demonstrates the application of reduced liquid solvent permeability.

EXAMPLE 4

Three containers were prepared as described in Example 3 and were evacuated of air by means of a vacuum pump, sealed, and then placed in a gas-tight enclosure filled with essentially pure oxygen gas. After storage in the enclosure for 10 days at 20° C. the concentrations of oxygen diffused into the containers was determined and found to be in the proportions 100 for the untreated container, 50 for the graft-copolymerised container, and 2 for the graft-copolymerised metal modified container. This demonstrates the application of reduced gas permeability.

Example 5

25 micron thick pre-fabricated films of low density polyethylene (LDPE), high density polyethylene (HDPE), polypropylene (PP), polytetrafluorethylene (PTFE) and polyvinylchloride (PVC) were separately immersed in an aqeuous solution containing 30% by volume of acrylic acid and 4 gm $1^{-1}$ of "Analar" ferrous sulphate contained in an aluminium alloy vessel. They were degassed, irradiated, washed and dried as set forth in Example 1, and produced films having graft contents varying from 20 to 45% by weight. These graft copolymers were further graft copolymerised with vinyl ferrocene monomer at a concentration of 50% by weight in benzene solution initiated by $^{60}$Co gamma radiation to a total dose of $2 \times 10^6$ rad.

Electrolytic resistance of the metal treated films was determined by an AC method in test cells containing aqueous electrolytes comprising 0.6N potassium chloride or 30% by weight of potassium hydroxide or 30% by volume of sulphuric acid. Electrolytic resistance of all of the sections of the films were found to be low varying between 0.5 ohm.cm$^2$ and 4.0 ohm cm$^2$.

This illustrates the potential use of the metal modified graft copolymers of the present invention as membrane separators and diaphragms for electrochemical power sources, fuel cells and electrosynthesis cells, for example in chlor-alkali diaphragm cells for the production of chlorine and sodium hydroxide or in similar cells for the production of hypochlorites.

Sections of the graft-copolymer and metal modified graft-copolymer films disclosed in this Example were cut into 5 cm diameter discs, supported on filter paper, and placed in a reverse osmosis test cell connected to a reverse osmosis test assembly. N/20 sodium chloride aqueous solution was pumped across the exposed faces of the films through a flow channel of 0.05 cm$^2$, at 300 cc per minute, at an initial pressure of 500 psi, thereafter increased to 1,000 psi. The flux and salt content of the fluid transported through the films were measured and it was found that the metal modified graft copolymers had better salt rejection than the simple graft copolymers.

EXAMPLE 6

25$\mu$ thick scived PTFE film (Polypenco Code No 58077, Bush No 3763, was graft copolymerised with acrylic acid substantially as described in Example 1. The graft copolymer was found to be 12.4% by weight of reacted acrylic acid based upon the final weight of the graft.

A chromium phosphate solution having the composition 1% by weight chromium nitrate, 88% by weight Analar orthophosphoric acid, 11% by weight of methanol based upon final solution weight was diluted by 4:1 in volume with methanol. A piece of the acid form of the PTFE/AA graft 18cm square was immersed in this solution at 20° C. for 1 minute, both surfaces being coated withdrawn vertically at an approximate rate of 22cm/min and immediately suspended in a hot air oven at 270° C. where it was retained for 30 minutes after which it was removed and allowed to cool in air.

The PTFE starting material (Sample 9), the PTFE/AA graft (Sample 10) and the chromium phosphate coated material (Sample 11) were tested for gas and water vapour permeability and the results are given below in Table 3. The permeability measurements were conducted at 25° C. on 15cm diameter specimens degassed to the dry state and employing equipment operated with a non-discriminatory detector so arranged as to supply either pure oxygen gas at 0% relative humidity or water vapour at 75% relative humidity in nitrogen as inert carrier gas.

Table 3

| | Oxygen | | Water Vapour | |
|---|---|---|---|---|
| Sample | Transmission Coefficient | Permeation Coefficient | Transmission Coefficient | Concentration at equilibrium (in ppm) |
| 9 | $24 \times 10^3$ | $3.4 \times 10^{-15}$ | 0.56 | 32 |
| 10 | $16 \times 10^3$ | $2.5 \times 10^{-15}$ | 3.07 | 176 |

Table 3-continued

| Sample | Oxygen | | Water Vapour | |
|---|---|---|---|---|
| | Transmission Coefficient | Permeation Coefficient | Transmission Coefficient | Concentration at equilibrium (in ppm) |
| 11 | $2.3 \times 10^3$ | $3.8 \times 10^{-16}$ | 1.08 | 62 |

The units in above Table 3 are defined as follows:

Transmission coefficient $(O_2)$-$cm^3_{STP}/m^2$ day atmosphere (oxygen)

Permeation coefficient - moles m/$m^2$ sec pascal

Transmission coefficient $(H_2O)$ - g/$m^2$ day (water vapour)

Concentration at equilibrium - parts per million of water vapour in a nitrogen stream flowing at 100ml/min.

EXAMPLE 7

$25\mu$ thick film of low density polyethylene (LDPE) prepared by British Visqueen (Ref No 348/N) was irradiated substantially as described in Example 1. The LDPE/AA graft copolymer was found to be 32.9% by weight of reacted acrylic acid based upon the final weight of the graft.

This LDPE/AA copolymer was thermally treated at 120° C. and converted to its potassium form by passing through a bath of 0.1N potassium hydroxide at 20° C. followed by a bath of 0.002N potassium hydroxide at 20° C. followed immediately by drying in an oven.

One sample 18cm square of each of the acid and potassium forms of the LDPE/AA graft copolymer was coated with chromium phosphate using the method and the solution disclosed in Example 6, the acid form of the graft copolymer being fired at 120° C. for 30 minutes and the potassium form at 120° C. for 15 minutes. The LDPE starting material (Sample 12), the LPDE/AA graft copolymer in both its acid (Sample 13) and potassium (Sample 14) forms and the chromium phosphate coated acid form (Sample 15) and potassium form (Sample 16) of the graft copolymer were tested for gas permeability and the results are given in Table 4 below.

Table 4

| Sample | Oxygen | | Water Vapour | |
|---|---|---|---|---|
| | Transmission Coefficient | Permeation Coefficient | Transmission Coefficient | Concentration at equilibrium (in ppm) |
| 12 | $19 \times 10^3$ | $1.3 \times 10^{-15}$ | 19.1 | 1,100 |
| 13 | $10 \times 10^3$ | $8.9 \times 10^{-16}$ | 28.7 | 1,650 |
| 14 | $7.5 \times 10^3$ | $5.7 \times 10^{-16}$ | 26.0 | 1,590 |
| 15 | $1.7 \times 10^3$ | $1.9 \times 10^{-16}$ | 9.0 | 520 |
| 16 | $4.9 \times 10^3$ | $6.9 \times 10^{-16}$ | 8.3 | 480 |

The units are as defined for Table 3 above.

I claim:

1. A composition of matter which is produced by contacting with a metal compound a synthetic substantially hydrophobic base polymer selected from polyolefins, copolyolefins, polyamides, copolyamides, halogenated polyolefins, polyesters, unsaturated polyesters, having a cross-linked copolymer graft at least in its surface region, the graft comonomer being selected from ethylenic carboxylic acids, amine esters of ethylenic carobxylic acids acrylamides and methacrylamides, followed by heating to cause reaction so that metal atoms or ions are chemically bound in the form of a stable inorganic glass in at least the surface region of the said graft.

2. A composition of matter as claimed in claim 1 and wherein the metal atoms or ions are selected from aluminium, iron, chromium, titanium, lead nickel, zinc, silver, cadmium, alkali metals and alkaline earth metals.

3. A composition of matter as claimed in claim 1 and wherein the metal atoms or ions are in a surface region of the said graft copolymer having a depth within the range $0.05\mu$ to $2\mu$.

4. A composition of matter as claimed in claim 3 and wherein the depth is within the range $0.1\mu$ to $0.2\mu$.

5. A composition of matter as claimed in claim 1 and wherein the said synthetic substantially hydrophobic base polymer is selected from low, medium or high density polyethylene, polypropylene, poly-4-methylpentene-1, a copolymer of any of the foregoing, nylon, polyvinyl chloride, polytetrafluoroethylene, polychlorofluoroethylene or a mixture of two or more of the foregoing.

6. A composition of matter as claimed in claim 1 and wherein the graft comonomer is selected from acrylic acid, methacrylic acid, and butylamine acrylate.

7. A composition of matter as claimed in claim 1 and which is a film material, the extent of the graft polymerisation being within the range 8% by weight and 70% by weight based upon the total weight of the graft copolymerised material.

8. A composition of matter as claimed in claim 1 and which is a film material, the extent of the graft copolymerisation being within the range 0.1% by weight to 5% by weight.

9. A composition of matter as claimed in claim 1 and wherein the said hydrophobic base polymer is selected from high density polyethylene, low density polyethylene, polypropylene, polytetrafluoroethylene and polyvinylchloride, the graft comonomer being selected from acrylic acid and butylamine acrylate and the metal atoms or ions being selected from chromium, aluminum and iron.

10. A method of applying a layer of metal containing inorganic glassy material to the surface of a polymeric material which comprises the steps of graft copolymerising the said polymeric material with a reactive vinyl monomer selected from ethylenic carboxylic acids, amine esters of ethylenic carboxylic acids, acrylamides and methacrylamides, contacting the said graft copolymer with a metal compound, and heating to cause reaction between the metal compound and the said graft copolymer whereby meatl atoms or ions are chemically bound in the form of a stable inorganic glass in at least the surface region of the said graft copolymer.

11. A method as claimed in claim 10 and wherein the polymeric material is selected from synthetic substantially hydrophobic base polymer selected from polyolefins, copolyolefins, polyamides, copolyamides, halogenated polyolefins, polyesters, unsaturated polyesters or a mixture of two or more of the foregoing.

12. A method as claimed in claim 10 and wherein the polymeric material is selected from low, medium or high density polyethylene, polypropylene, poly-4-methylpentene-1, a copolymer of any of the foregoing, nylon, polyvinyl chloride, polytetrafluoroethylene, polychlorofluoroethylene or a mixture of two or more of the foregoing.

13. A method as claimed in claim 10 and wherein the reactive vinyl monomer is selected from acrylic acid, methacrylic acid and butylamine acrylate.

14. A process for the production of a composition of matter wherein a graft copolymer having a synthetic substantially hydrophobic base polymer selected from polyolefins, copolyolefins, polyamides, copolyamides, halogenated polyolefins, polyesters, unsaturated polyesters, having a cross-linked copolymer graft at least in its surface region, the graft comonomer being selected from ethylenic carboxylic acids, amine esters of ethylenic carboxylic acids, acrylamides and methacrylamides is contacted with a metal compound followed by heating to cause reaction between the metal compound and the said graft copolymer whereby metal atoms or ions are chemically bound in the form of a stable inorganic glass in at least the surface region of the said graft copolymer.

15. A process for chemically bonding metal atoms or ions in the region of the surface of a graft copolymmer having a synthetic substantially hydrophobic base polymer selected from the group consisting of polyolefins, copolyolefins, polyamides, copolyamides, halogenated polyolefins, saturated polyesters and unsaturated polyesters, said copolymer having a cross-linked copolymer graft at least in its surface region, the graft comonomer being selected from ethylenic carboxylic acids, acrylamides and methacrylamides, said process comprising contacting by spraying or dipping the said graft copolymer with a solution containing a metal compound which is a complex aluminium, iron, chromium or titanium phosphate, and heating the resulting product to cause reaction between the metal compound and the said graft copolymer.

16. A process as claimed in claim 14 annd wherein a solution of a metal compound selected from alkali metal hydroxides, alkaline earth metal hydroxides, copper nitrates, copper sulphates, copper chlorides, lead sulphates and salts of iron, nickel, chromium, zinc, silver, cadmium and aluminium is applied to the said graft copolymer followed by heating to remove the solvent and by flash heating to cause chemical binding of individual metal atoms or ions within or upon the surface of the said graft copolymer.

17. A process as claimed in claim 16 and wherein the time of contact between metal compound solution and the said graft copolymer is controlled so that the penetration of the said metal compound into the said graft copolymer takes place to a perdetermined extent.

18. A process as claimed in claim 17 and wherein the flash heating is by flaming, induction heating or by hot electrically sustained flames.

19. A process as claimed in claim 14 and wherein the metal compound is a metal containing polymerisable comonomer which is contacted with the said graft copolymer in solution followed by polymerisation of the metal containing copolymerisable comonomer by radiation, ionic or free radical initiated process.

20. A process as claimed in claim 19 and wherein the metal containing polymerisable comonomer is vinyl ferrocene.

21. The composition of matter of claim 1 wherein the hydrophobic base polymer is polyethylene and the graft monomer is acrylic acid.

22. A process for the production of a composition of matter which is a polymeric material having metal atoms or ions at least in the surface region thereof wherein a graft copolymer having a synthetic substantially hydrophobic base polymer selected from polyolefins, copolyolefins, polyamides, copolyamides, halogenated polyolefins, polyesters, unsaturated polyesters, having a cross-linked copolymer graft at least in its surface region, the graft comonomer being selected from ethylenic carboxylic acids, amine esters of ethylenic carboxylic acids, acrylamides and methacrylamides is contacted with a solution of a complex aluminum, iron, chromium or titanium phosphate which is applied to the said graft copolymer by dipping or spraying followed by heating so removing the solvent and further heating to decompose the metal complex to a stable inorganic glass bonded within or on the surface of the said graft copolymer.

23. A process as claimed in claim 22 and wherein the time of contact between metal compound solution and the said graft copolymer is controlled so that the penetration of the said metal compound into the said graft copolymer takes place to a predetermined extent.

24. A process for the production of a composition of matter which is a polymeric material having metal atoms or ions at least in the surface region thereof wherein a graft copolymer having a synthetic substantially hydrophobic base polymer selected from polyolefins, copolyolefins, polyamides, copolyamides, halogenated polyolefins, polyesters, unsaturated polyesters, having a cross-linked copolymer graft at least in its surface region, the graft comonomer being selected from ethylenic carboxylic acids, amine esters of ethylenic carboxylic acids, acrylamides and methacrylamides is contacted with a solution of a metal compound selected from alkali metal hydroxides, alkaline earth metal hydroxides, copper nitrates, copper sulphates, copper chlorides, lead sulphates and salts of iron, nickel, chromium, zinc, silver, cadmium and aluminium applied to the said graft copolymer followed by heating to remove the solvent and by flash heating to cause chemical binding of individual metal atoms or ions within or upon the surface of the said graft copolymer.

25. A process as claimed in claim 24 and wherein the time of contact between metal compound solution and the said graft copolymer is controlled so that the penetration of the said metal compound into the said graft copolymer takes place to a predetermined extent.

26. A process as claimed in claim 25 and wherein the flash heating is by flaming, induction heating or by hot electrically sustained plasma.

27. A process for the production of a composition of matter which is a polymeric material having metal atoms or ions at least in the surface region thereof wherein a graft copolymer having a synthetic substantially hydrophobic base polymer selected from polyolefins, copolyolefins, polyamides, copolyamides, halogenated polyolefins, polyesters, usaturated polyesters, having a cross-linked copolymer graft at least in its surface region, the graft comonomer being selected from ethylenic carboxylic acids, amine esters of ethylenic carboxylic acids, acrylamides and methacrylamides is contacted with a solution of a metal containing polymerizable comonomer followed by polymerization of the metal containing copolymerizable comonomer by radiation, ionic or free radical initiated process.

28. A process as claimed in claim 19 and wherein the metal containing polymerizable comonomer is vinyl ferrocene.

29. A process as claimed in claim 15 and wherein the time of contact between metal compound solution and the said graft copolymer is controlled so that the penetration of the said metal compound into the said graft copolymer takes place to a predetermined extent.

30. A process as claimed in claim 15 wherein the flash heating is by flaming, induction heating or by hot electrically sustained plasma.

* * * * *

UNITED STATES PATENT AND TRADEMARK OFFICE
CERTIFICATE OF CORRECTION

PATENT NO. : 4,148,839
DATED : April 10, 1979
INVENTOR(S) : Peter J. Fydelor

It is certified that error appears in the above-identified patent and that said Letters Patent are hereby corrected as shown below:

Please change the assignee to read as follows:

--The Secretary of State for Defence in Her Britannic Majesty's Government of the United Kingdom of Great Britain and Northern Ireland, Whitehall, London, England. --

Signed and Sealed this

Sixth Day of November 1979

[SEAL]

Attest:

RUTH C. MASON
Attesting Officer

LUTRELLE F. PARKER
Acting Commissioner of Patents and Trademarks